INVENTOR
J. MICHAL
BY
P. C. Smith
ATTORNEY

April 1, 1952 J. MICHAL 2,591,580

SPECIAL TRUNK CIRCUITS FOR TRANSMITTING TONES TO CALLING SUBSCRIBERS

Filed Oct. 29, 1948 2 SHEETS—SHEET 2

INVENTOR
J. MICHAL
BY P. C. Smith
ATTORNEY

Patented Apr. 1, 1952

2,591,580

UNITED STATES PATENT OFFICE 2,591,580

SPECIAL TRUNK CIRCUITS FOR TRANSMITTING TONES TO CALLING SUBSCRIBERS

Joseph Michal, Jackson Heights, N. Y., assignor to Bell Telephone Laboratories, Incorporated, New York, N. Y., a corporation of New York Application October 29, 1948, Serial No. 57,382

7 Claims. (Cl. 179—18)

Figure 1:
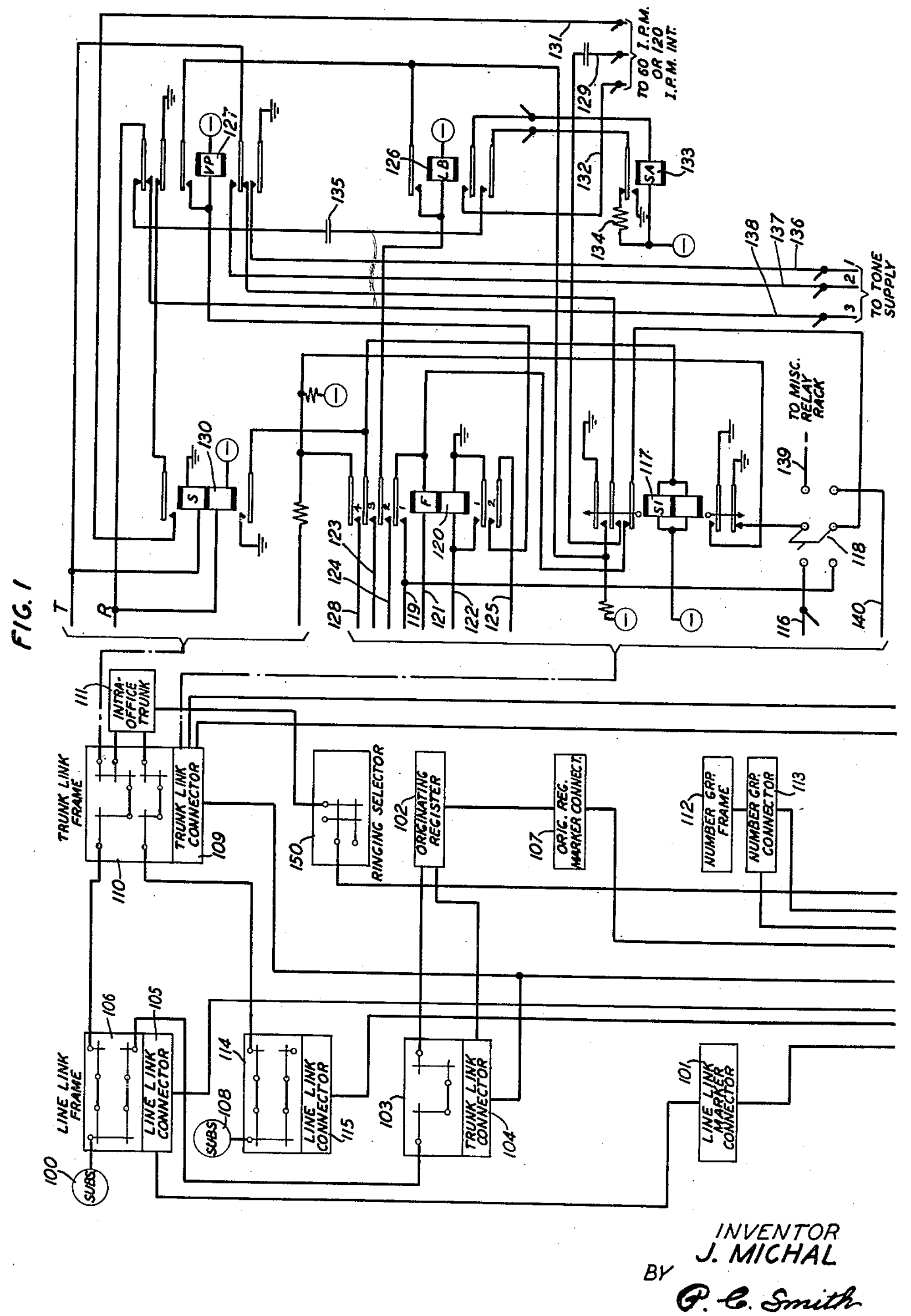

This invention relates to telephone systems in which connections between subscribers' lines are established by automatic switching equipment and more particularly to trunk circuits for selectively supplying line busy or paths busy or vacant code and partial dialing tone signals to any calling subscribers' lines.

Trunk circuits of the type to which the present invention is directed are particularly applicable to a telephone system of the so-called cross bar type disclosed in Patent No. 2,585,904, granted to A. J. Busch, February 19, 1952.

In telephone systems of the prior art, it is common practice to provide means at a terminating switching stage of an established connection, for example, at an incoming selector or incoming junctor for transmitting a busy tone signal over the established talking circuit to the calling line if the called line when tested is found to be busy and to apply a busy tone signal to the calling line, as for example, from a district selector or district junctor in the event that an all paths busy condition is encountered during the establishment of a desired connection. Since there are large numbers of incoming selectors or incoming junctors and large numbers of district selectors or district junctors in each office of an exchange area, the provision of means to supply a busy tone on line busy or all paths busy conditions, involves a large amount of equipment and cabling facilities from the one supply source.

It is therefore an object of the present invention to materially simplify and reduce the amount of equipment required for applying busy tone to calling subscribers' lines.

It is a further object of the invention to enable the busy tone equipment to also supply a special tone to a calling line in the event the calling subscriber dials the office code digits of a non-existent office or fails to completely dial a complete line number.

These objects are attained in accordance with the present invention by the provision of a small group of special trunk circuits, an idle one of which may be seized and connected to the calling line in the event the called line is found to be busy, in the event all paths over which a connection might be established from the calling line to the called line are found to be busy or in the event the subscriber dials the office code digits of a non-existent office or fails to dial all the digits of a directory number. Each trunk circuit is provided with selectively operable means whereby the proper type of tone signal may be transmitted to the calling line to signify to the calling subscriber in a general way the reason for the failure of the central office equipment to establish the desired connection.

Figure 2:
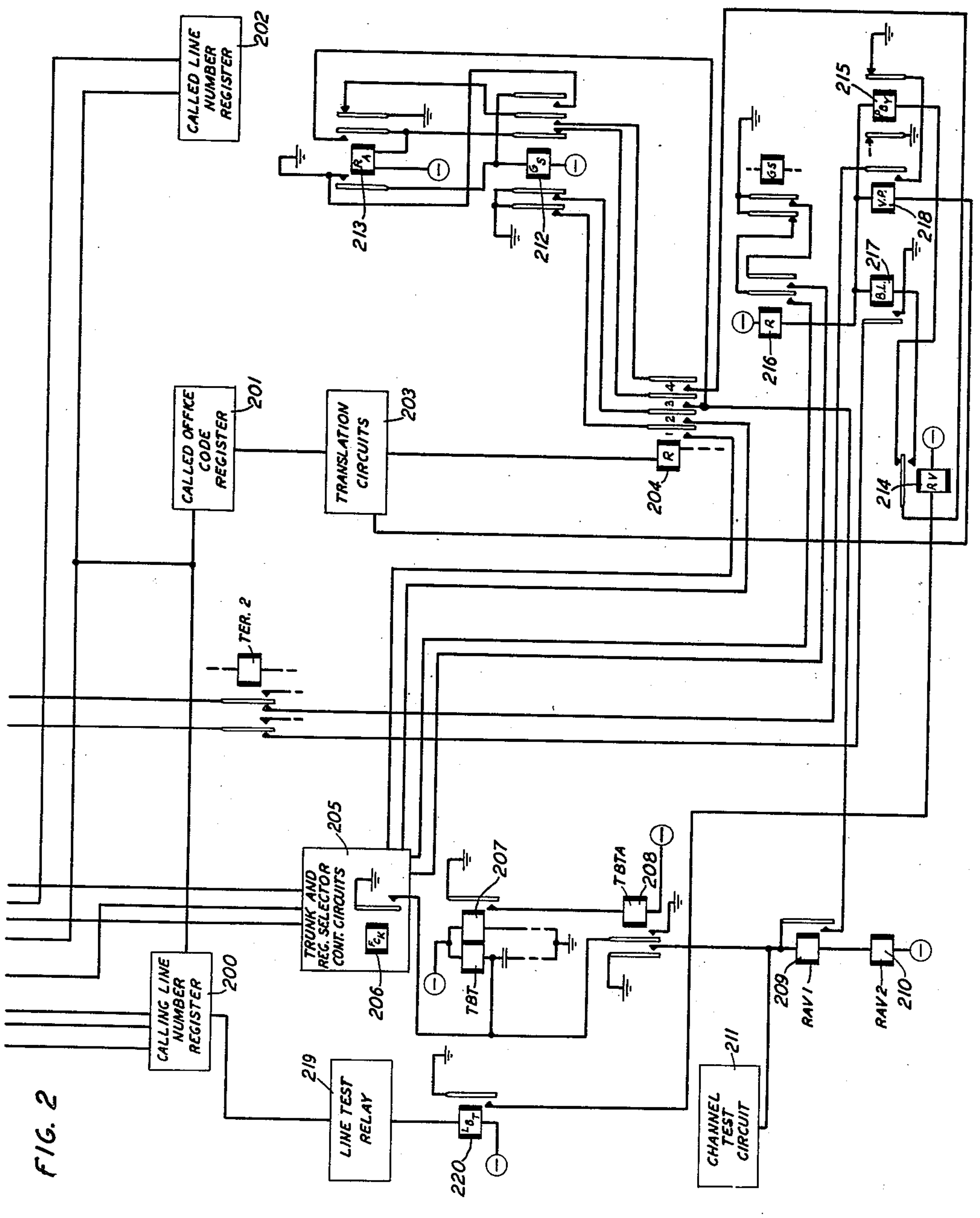

The novel features of the invention are set forth in the appended claims and the invention as to its organization and its mode of operation will be best understood from the following detailed description when read in connection with the drawing in which:

Fig. 1 shows in the left portion thereof the schematic representation of line link frames on which calling lines appear, trunk link frames and trunk link connectors, line link connectors, an originating register, an originating register marker connector, number group frame and number group connector and in the right portion thereof a complete tone trunk circuit in accordance with the present invention; and Fig. 2 shows such portions of a marker as are deemed necessary to an understanding of the invention.

The circuits and apparatus schematically indicated in the drawings are fully disclosed and described in the patent of A. J. Busch hereinbefore referred to and such portions of said patent as are of assistance in the comprehension of the present invention are to be considered as embodied in the disclosure of this patent.

The invention will now be considered in detail. It will be assumed that the calling subscriber at the substation designated 100 in Fig. 1, initiates a call whereupon a connection is established from the line link frame on which the calling line terminates to an idle marker. Access to the marker is gained through the line link marker connector 101 which connects only such leads as are necessary to identify the line link frame to the marker by its frame number and to inform the marker that a dialing connection is to be established. The marker then proceeds through its trunk and register selection control circuits 205 to select an idle originating register such as is schematically disclosed by the box 102 which will later serve to transmit a dial tone to the calling line and to receive dial pulses.

Originating registers are distributed over the trunk link frames. By means of test leads extending from the registers to the marker, the marker determines which trunk link frames have idle registers and which frames are not being used by other markers. It then preferentially selects an idle frame with idle registers and connects to the frame through the trunk link connector. The marker than preferentially selects an idle register and connects to it. It will be assumed that the originating register 102 is idle and is accessible from the idle trunk link frame 103 which frame is connected to the marker through the trunk link frame connector 104.

The determination of the location of the calling line is begun as soon as the marker is seized and continues while the marker is selecting an idle register. Line location is made in terms of the line link frame, the vertical group, the horizontal group and the vertical file. A line link vertical group of subscribers' lines is five verticals wide and ten switches high. Following marker seizure, the marker determines which vertical group contains the line awaiting service. The vertical group contains a maximum of fifty subscribers' lines, therefore the determination of the vertical group localizes the subscribers' lines as within fifty of the maximum of 690 lines terminating on the frame.

A line link horizontal group of subscribers' lines is one switch high and the width of the supplied line of switches, the maximum width being that of a frame containing fourteen vertical groups. The marker determines which horizontal group has one or more lines within the selected vertical group awaiting service and the marker then preferentially selects one group. The line to be served has now been located within five lines as determined by the selected vertical and horizontal groups.

Line location does not proceed past the horizontal group selection until the marker has seized the trunk link frame. Following trunk link frame seizure, the marker seizes the line link frame 106 which has identified itself through its marker connector 101 whereby leads are extended to the marker for vertical file identification and for completing connections to the frame. A line link vertical file of subscribers' lines is one vertical wide and ten switches high. Thus one vertical group contains five vertical files. The marker tests the five lines found in the vertical group in which the calling line is located and if more than one line is awaiting service, the marker preferentially selects one. The marker then transmits the line link frame number and the selected line location to the originating register 102.

After the horizontal group has been determined and an originating register seized, the marker selects one of ten channels which may be used to connect the calling line to the register. The marker tests the junctor, line link and trunk link in each channel to see what junctors or links are already in use on other calls. The lowest numbered available channel is chosen and the marker operates the select and hold magnets on the line link and trunk link frames to establish the channel. It has been assumed that the selected channel extends over the line link frame 106 and the trunk link frame 103. When the channel is selected, the marker indicates to the register the number of the line link used in the channel and the register stores this information for future use.

After the channel has been established and checked, the marker releases leaving in the register 102 the line link frame number, calling line location and the line link number used in the dialing connection to the register.

The calling subscriber then receives a dialing tone from the originating register after which the subscriber proceeds to dial the digits of the wanted line number, which digit impulses are registered in the originating register. After the entire number has been dialed, the register calls in a marker over the originating register marker connector 107. As soon as a marker has been connected to the register, the register proceeds to transmit to the marker the calling subscriber's line link frame location which is then registered in the calling line number register 200 of the marker, the office code digits of the called line number which are registered in the called office code register 201 of the marker and the numerical digits of the called line number which are registered in the called line number register 202 of the marker. From the called office code register 201, the marker proceeds through the translator circuit 203 to determine the routing of the desired connection thereby resulting in the operation of a route (R) relay. It will be assumed that in the case under consideration the desired subscriber's line 108 terminates in the same office as the calling line 100 and that therefore the route relay 204 is effective to control the setting up of a connection between the subscribers' lines over an intraoffice trunk.

To accomplish this, the marker seizes an idle trunk link frame which has idle intraoffice trunks. It will be assumed that the trunk link frame 110 is seized over the trunk link connector 109 and connects to an idle intraoffice trunk, for example 111, the selection being similar to that of an originating register as previously described.

While trunk selection is taking place, the marker determines the line link frame location of the called line by consulting the number group. The marker seizes the number group frame 112 over the number group connector 113 and passes the numerical digits of the called number to it from the called line number register 202. The number group translates the numerical digits into the calling line location in terms of line link frame number, vertical group, horizontal group and vertical file. The number group also gives the marker information for setting the ringing selection switch 150 for ringing the called subscriber. The trunk appears on a vertical file of the switch and different ringing codes appear on the horizontals. The marker after receiving the required information from the number group and after an idle channel has been selected, operates the selected hold magnet to connect the proper individual or party line ringing into the trunk. The marker then disconnects and leaves the switch held by the trunk.

The marker seizes the line link frame on which the desired line terminates after the called number information has been received from the number group and after the trunk link frame has been seized. It will be assumed that the line link frame 114 is seized through the line link connector 115. The called line 108 is then selected and tested for idle or busy condition. If the called line is idle, the marker interconnects the called line and the intraoffice trunk by an idle channel. The marker tests to see what junctors are already in use on other calls. The lowest numbered available channel is chosen and the marker operates the select and hold magnets on the line link and trunk link frames 114 and 110 to establish the channel. If the called line is busy, the intraoffice trunk 111 is released and the calling line is connected through a channel to a tone trunk in the trunk link frame 110 as will be hereinafter described.

After the marker establishes the terminating connection, it seizes the line link frame 106 of the calling subscriber and selects an idle channel between the intraoffice trunk and the calling line. The dialing connection previously established is not released until the marker determines that an idle channel exists between the calling line and the intraoffice trunk.

The marker has recorded the number of the line link used in establishing the dialing connection to the originating register 102 and may therefore reuse that line link as part of the originating connection if the link is part of the lowest numbered available channel. The marker then proceeds to operate the select and hold magnets on the line link and trunk link frames 106 and 110 to establish a connection from the calling line 100 to the intraoffice trunk 111, over the selected channel. The calling subscriber's line 100 is now connected over the line link frame 106, the trunk link frame 110, the intraoffice trunk 111, the trunk link frame 110 and the line link frame 114 to the called line 108. The marker now becomes disconnected and releases the originating register 102.

It will be assumed that in the establishment of the connection and the test of the availability of an originating register or intraoffice trunk circuit by the trunk and register selection control circuits 205 of the marker, no idle register or idle trunk circuit was found. This condition is recognized by the operation of the frame check relay 206 of the circuit 205 which enables the operation of the trunk busy timing (TBT) relay 207, and by the failure to open the circuit of relay 207 before it has completed its timing cycle. In such a case, when relay 207 operates, it in turn operates the TBTA relay 208 which establishes the circuit for the route advance (RAV) relays 209 and 210.

In a similar manner when the test for an idle channel is being made by the channel test circuit 211, the failure to find an idle channel within a timed interval may also cause the operation of the route advance relays 209 and 210.

With the route advance relay 209 operated, its operating ground is extended over the No. 3 contacts of operated route relay 204, over the inner right back contact of the ground supply (GS) relay 212 and through the winding of the route auxiliary (RA) relay 213 to battery. The route auxiliary relay 213 which is allocated to route relay 204, then operates, locks over its inner right contacts and the contacts of relay 209 to the operating ground for relay 209 and, over its left contacts, establishes an obvious operating circuit for relay 212. Relay 212 thereupon operates, locks over its outer right contacts to ground independent of relay 213 and opens the initial operating circuit of relay 213 at its right back contact. As soon as ground is removed at the contacts of relay 208 or at the channel test circuit 211, the locking circuit for relay 213 is opened and relay 213 releases.

A circuit is now established from ground over the right back contact of relay 213, the middle right contacts of relay 212, the No. 4 contacts of route relay 204, the back contact of the revertive call (RV) relay 214, through the winding of paths busy (PBY) relay 215 and through the winding of tone trunk route relay 216 to battery. Route relay 216 upon operating informs the trunk and register selection control circuit 205 that a connection should now be established from the calling line 100 to an idle tone trunk circuit such as is shown in the right portion of Fig. 1. These trunk circuits may appear on one or more of the trunk link frames.

There is a frame test lead 116 for each trunk link frame on which these trunk circuits appear and each idle trunk circuit supplies ground from the lower back contact of the S1 relay 117 and the upper left normally closed contacts of make busy switch 118, to test lead 116. The marker has access to the test lead 116 through the trunk link connector 109 and knows that there is at least one idle trunk circuit on each frame corresponding to a grounded lead 116. The marker then proceeds to select one of the frames with available trunk circuits and supplies ground on the frame lead 119 to all the tone trunk circuits appearing on that frame. It will be assumed that the trunk circuit shown in Fig. 1 is one of such trunk circuits which appear on the trunk link frame 110. This ground on lead 119 is applied over the lower left contacts of make busy switch 118 and the upper back contact of the S1 relay 117 and to the right terminal of the upper operating winding of the F relay 120 of each trunk circuit that is idle. The marker determines which of the trunk circuits are idle while looking for this ground through the winding of the F relay 120 and over the busy test lead 121 and selects one of the idle trunk circuits. These trunk link frame and trunk selections are carried out by the marker in the same general manner as the register and intraoffice trunk selections previously referred to.

When the marker selects a trunk circuit, for example, the one disclosed in Fig. 1, it applies battery to the individual lead 121 thereby operating the F relay 120 of such trunk circuit. Relay 120 upon operating locks over its upper No. 1 contacts, over lead 119 to ground at the marker, supplies ground over its lower No. 1 contacts and lead 122 to the trunk link connector to hold the trunk link connector relay (not shown), connects the leads 123, 124 and 125 over its upper Nos. 3 and 2 and lower No. 2 contacts, to the windings of the S1 relay 117, of the LB relay 126 and of the VP relay 127, respectively, and connects lead 128 over the upper contacts 4 to the lower front contact of relay 117.

The marker thereafter connects ground to lead 123, thereby causing the operation of the S1 relay 117. Relay 117 upon operating removes ground at its lower back contact from lead 116 and at its upper back contact opens the operating circuit of the F relay 120. Relay 120 is, however, held operated from the marker. The removal of ground from lead 116 will cause the trunk circuit to appear busy when the marker disconnects. At its upper contacts, relay 117 supplies locking ground for the tone class relays 126 and 127 should either one of them be subsequently operated, and prepares a tone circuit from the source of interrupted tone over conductor 129, the middle upper contacts of relay 117, the lower back contact of relay 127 and to the tip conductor T of the tone trunk circuit. Relay 117 also connects ground over its lower front contact and the upper No. 4 contacts of relay 120 and over lead 128 to the marker to inform the marker that the trunk circuit is ready to receive information concerning the class of tone which it is to supply.

It will first be assumed that an all paths busy condition has been encountered by the marker and that consequently with the PBY relay 215 of the marker operated and neither the BL relay 217 or the VP relay 218 operated, no class signal grounds are applied to leads 124 and 125 of the trunk circuit and therefore neither class relay 126 nor 127 is operated.

When the marker thereafter disconnects from the trunk circuit, the F relay 120 releases, in turn releasing the trunk link connector relay and removes ground from lead 128. With the trunk connector relay released, the calling party is connected over the trunk link frame with the tone trunk circuit and the S relay 130 operates over the tip and ring conductors of the trunk circuit and over the calling line loop. Relay 130 upon operating, establishes over its lower contacts a holding circuit for the slow-to-release relay 117 to keep relay 117 operated, and over its upper contacts supplies a starting ground over the middle upper back contact of relay 127, over the upper contacts of relay 130 and to the interrupter start conductor 131. Relay 117 is slow enough in releasing to hold over the release of the F relay 120, the release time of the associated trunk connector relay and the operate time of relay 130 and also to hold over any extra digits which may be dialed by the calling subscriber.

With the tone interrupter started, tone current interrupted at 60 or 120 times per minute is transmitted over the circuit previously traced to line conductor T of the trunk circuit, thence over the tip of the established connection to the calling line, over the calling line loop, back over the ring of the established connection and the ring conductor R of the trunk circuit, through the lower winding of the S relay 130 to battery. The subscriber hears the interrupted tone as a busy tone signal.

If the marker in establishing the connection finds the called line to be busy, then the line test circuit 219 causes the operation of the LBT relay 220 which in turn causes the operation of the RV relay 214. When thereafter the RA and GS relays 213 and 212 operate, and relay 213 releases, the circuit previously traced from ground over the back contact of relay 213 and front contacts of relays 212 and 204 now extends over the front contact of relay 214 and through the windings of relays 217 and 216 to battery. The route relay 216 now functions as before to cause the selection and connection of an idle tone trunk circuit to the calling line. It will be assumed that the trunk circuit of Fig. 1 is selected as before and that relays 117 and 120 of such trunk are operated.

In the case now under consideration with the BL relay 217 of the marker operated, a busy line class signal is transmitted to the trunk circuit by the application of ground by relay 217 of the marker to lead 124 of the trunk circuit whereby, with relay 120 operated, the LB tone class relay 126 is operated and locked over its upper contacts and the upper contacts of operated relay 117 to ground. When the calling line is cut through to the trunk circuit and the S relay 130 operates, the start lead 131 of the tone source circuit is closed and tone current interrupted at 60 or 120 impulses per minute is applied from conductor 129, over the next to upper contacts of relay 117, the lower back contact of relay 127 and thence as traced over the calling line loop and the calling subscriber hears the busy tone signal.

In addition, however, the busy tone interrupter applies interrupter ground over lead 132, over the inner lower contacts of relay 126 and through the winding of the SA relay 133 to battery. Relay 133 being slow acting does not operate for a few milliseconds following the connection of the tone source and does not release for a few milliseconds following the removal of the tone source. Following the operation of relay 126 but before relay 133 operates a discharge path for condenser 135 is established from battery through the lower winding of relay 130 over the upper back contact of relay 127, through condenser 135, over the lower contacts of relay 126, over the back contact of relay 133 and through resistor 134 to battery. When however relay 133 operates the discharge path for the condenser is opened at its back contact and a charging path is closed to ground over its front contact. The charging and discharging of condenser 135 through the lower winding of relay 130 causes the application of clicks to the R conductor of the trunk circuit so that a service observing operator may be able to distinguish between a line busy and an all paths busy condition. Relay 133 insures that these clicks occur a few milliseconds after the beginnings and ends of the tone periods.

If the calling subscriber dials the office code digits of a non-existent office, that is, a vacant code or only partially dials, the translator circuit 203 is so operated as to cause the operation of the vacant code-partial dial (V. P.) relay 218 in series with the route relay 216. The route relay 216 now functions as before to cause the selection and connection of an idle tone trunk circuit to the calling line. It will be assumed that the trunk circuit of Fig. 1 is selected as before and that relays 117 and 120 of such trunk circuit are operated.

On the call now under consideration with the V. P. relay 218 operated and the PBY relay 215 unoperated, ground is applied over the right back contact of relay 215, over the contacts of relay 218 to lead 125 of the trunk circuit whereby with relay 120 operated, the tone class relay 127 is operated and locked over its inner upper contacts and the upper contacts of operated relay 117 to ground. Relay 127 over its lower contacts connects ground to the start lead 136 of the no-such-number tone circuit to start such tone circuit and at its middle upper back contact opens the start lead 131 of the busy tone interrupter circuit.

When the calling line is cut through to the trunk circuit and the S relay 130 operates, a tone circuit is established from the no-such-number tone circuit, over lead 137, the inner lower contacts of relay 127, the tip conductor T of the trunk and the tip of the established connection to the calling line, over the calling line loop and back over the ring of the established connection and the ring conductor R of the trunk, through the lower winding of relay 130 to battery and at the same time a tone circuit is established from tone lead 138, over the upper front contact of relay 127 and the established connection over the calling line loop to ground through the upper winding of relay 130.

When the calling subscriber disconnects after hearing any one of these tone signals previously discussed, relay 130 releases, in turn opening the locking circuit of relay 117 which in turn releases. The release of relay 130 opens the start lead 131 of the busy tone source if in use, and the release of relay 117 opens the locking circuit of either operated relay 126 or 127 whereupon such relay releases. The release of relay 117 also restores the trunk circuit to an idle condition by connecting ground over its lower back contact to lead 116 and closing over its upper back contact the initial operating circuit for relay 120 whereby such relay may be reoperated.

The make busy switch 118 is provided to make the trunk circuit busy thus taking it out of service. It may be operated while the trunk circuit is in use since it merely opens the lead 116 and the operating path of the F relay 120 which are already opened if the trunk is in use. When the switch 118 is operated to the right and the trunk is idle, it connects a ground to the lead 139 which is common to all trunks to light a lamp on the miscellaneous relay rack as an indication that one or more trunks on that trunk link frame are out of service. Switch 118 also transfers the circuit for operating the F relay 120 from lead 119 to lead 140 whereby the marker can route a test call to a particular trunk although it has been made busy. On such a call the marker will connect ground not only to lead 119 but to lead 140.

The release of the switches on the line link and trunk link frames over which the connection to the tone trunk circuit is established is accomplished in the well-known manner when the calling subscriber restores his receiver to the switchhook and a description thereof herein is deemed to be unnecessary.

What is claimed is:

1. In a telephone system, subscribers' lines, automatic switches, a common control circuit for operating said switches to complete connections to and from said lines, a trunk circuit, a plurality of distinctive tone sources associated with said trunk circuit, means conditioned under the control of a calling one of said subscribers' lines to register in said control circuit the identity of said calling line and the designation representing a desired connection, means in said control circuit operated, if said control circuit fails to control said switches to complete said desired connection, including means to indicate the failure and means to identify the cause of said failure, means under the control of said failure indicating means to cause said control circuit to seize said identified calling line and said trunk circuit and to operate said switches to connect said calling subscriber's line to said trunk circuit, and means in said trunk circuit operated by said cause identifying means to selectively render one of said tone sources effective to signal the calling subscriber.

2. In a telephone system, subscribers' lines, automatic switches, a common control circuit for operating said switches to complete connections to and from said lines, a trunk circuit, a source of busy tone current associated with said trunk circuit, means conditioned under the control of a calling one of said subscribers' lines to register in said control circuit the identity of said calling line and the designation representing a desired connection, means in said control circuit for testing the idle or busy condition of the desired one of said subscribers' lines, busy line indicating means in said control circuit operated by said testing means under control of a busy test condition of said desired line, means under the control of said busy line indicating means to cause said control circuit to seize said identified calling line and said trunk circuit and to operate said switches to connect said calling line to said trunk circuit, and means in said trunk circuit controlled from said common control circuit for connecting said source of tone current to said calling line.

3. In a telephone system, subscribers' lines, automatic switches, a common control circuit for operating said switches to complete connections to and from said lines, a trunk circuit, a source of tone current associated with said trunk circuit, means conditioned under the control of a calling one of said subscribers' lines to register in said control circuit the identity of said calling line and the designation representing a desired connection, means in said control circuit for testing for an available idle path over which the desired connection may be established, paths busy indicating means in said control circuit operated by said testing means, if no idle path is found to be available, means under the control of said paths busy indicating means to cause said control circuit to seize said identified calling line and said trunk circuit and to operate said switches to connect said calling subscriber's line to said trunk circuit, and means in said trunk circuit controlled from said common control circuit for connecting said source of tone current to said calling line.

4. In a telephone system, subscribers' lines, automatic switches, a common control circuit for operating said switches to complete connections to and from said lines, a trunk circuit, a source of tone current associated with said trunk circuit, means conditioned under the control of a calling one of said subscribers' lines to register in said control circuit the identity of said calling line and the designation representing a desired connection, means in said control circuit operated if a calling subscriber dials a connection to a non-existent office of the exchange area or dials an insufficient number of digits, means in said control circuit responsive to said latter means to cause said control circuit to seize said calling line and said trunk circuit and to operate said switches to connect said calling line to said trunk circuit, and means in said trunk circuit controlled from said control circuit for connecting said source of tone current to said calling line.

5. In a telephone system, subscribers' lines, automatic switches, a common control circuit for operating said switches to complete connections to and from said lines, a trunk circuit, a source of busy tone current associated with said trunk circuit, means conditioned under the control of a calling one of said subscribers' lines to register in said control circuit the identity of said calling line and the designation representing a desired connection, means in said control circuit for testing the idle or busy condition of a desired one of said subscribers' lines, busy line indicating means in said control circuit operated by said testing means, if said desired line is found to be busy, means under the control of said busy line indicating means to cause said control circuit to seize said identified calling line and said trunk circuit and to operate said switches to connect said calling subscriber's line to said trunk circuit, means in said trunk circuit controlled from said common control circuit for connecting said source of tone current to said calling line, a condenser in said trunk circuit, a charging path for said condenser extending over said calling line, and means in said trunk circuit operated by said busy line indicating means for intermittently discharging said condenser whereby a busy tone signal modified by condenser clicks may be heard on the calling line.

6. In a telephone system, subscribers' lines, automatic switches, a common control circuit for operating said switches to complete connections to and from said lines, a plurality of trunk circuits, a plurality of sources of distinctive tone current associated with said trunk circuits, means conditioned under the control of a calling one of said subscribers' lines to register in said control circuit the identity of said calling line and the designation representing a desired connection, means in said control circuit operated, if said control circuit fails to control said switches to complete said desired connection, including means to indicate the failure and means to identify the cause of said failure, means under the control of said failure indicating means to cause said control circuit to select an idle one of said trunk circuits, to seize said identified calling line and said selected trunk circuit and to operate said switches to connect said calling line with said selected one of said trunk circuits, and means in said selected trunk circuit operated by said cause identifying means to selectively render one of said tone sources effective to signal the calling subscriber.

7. In a telephone system, subscribers' lines, automatic switches, a common control circuit for operating said switches to complete connections to and from said lines, a trunk circuit, sources of tone current associated with said trunk circuit, means under the control of a calling one of said subscribers' lines to register in said control circuit the designation of a desired line, means in said control circuit for testing the idle or busy condition of said designated line, a line busy relay, means to operate said line busy relay under the control of said line testing means if said desired line is busy, means in said control circuit for testing if there is an idle path available over which the desired connection may be established, a paths busy relay, means to operate said paths busy relay under the control of said paths testing means if no idle path is available, a vacant code relay, means to operate said vacant code relay under the control of said registering means if said designation does not represent an existing line, a route relay operated upon the operation of any one of said first relays to cause said control circuit to control said switches to connect said calling subscriber's line to said trunk circuit, and means in said trunk circuit selectively operable by said first relays to selectively render one of said tone sources effective to signal the calling subscriber.

JOSEPH MICHAL.

REFERENCES CITED

The following references are of record in the file of this patent:

UNITED STATES PATENTS

| Number | Name | Date |
|---|---|---|
| 1,437,357 | Powell | Nov. 28, 1922 |
| 1,628,358 | Friendly | May 10, 1927 |
| 1,678,503 | Friendly | July 24, 1928 |
| 2,293,620 | Osten-Sacken | Aug. 18, 1942 |
| 2,332,878 | Vroom | Oct. 26, 1943 |
| 2,355,908 | Dehn | Aug. 15, 1944 |
| 2,508,646 | Marble | Apr. 23, 1950 |